Oct. 19, 1926.

W. L. CARSON

ROTATIVE VALVE

Filed Oct. 18, 1921  2 Sheets-Sheet 1

1,603,837

Inventor
William L. Carson
By W.L. & A.L. Reynolds
Attorneys

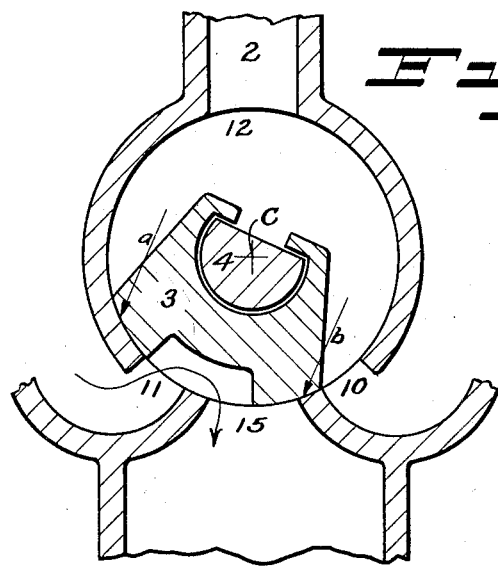
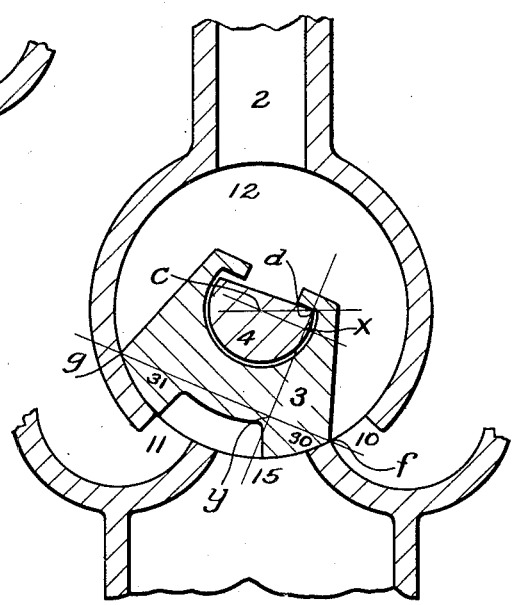
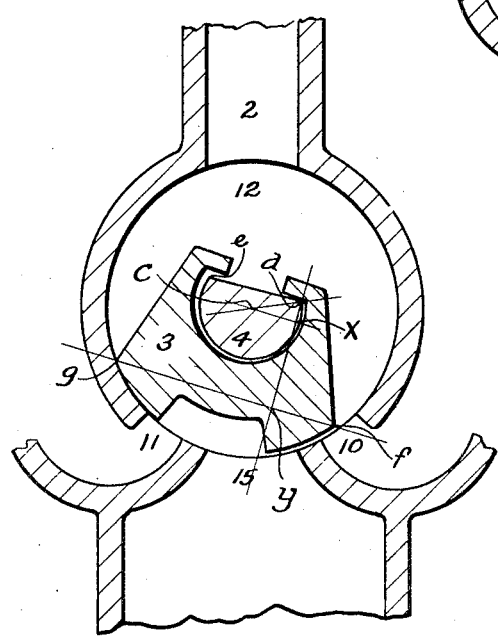

Patented Oct. 19, 1926.

1,603,837

UNITED STATES PATENT OFFICE.

WILLIAM L. CARSON, OF SEATTLE, WASHINGTON, ASSIGNOR TO WASHINGTON IRON WORKS, OF SEATTLE, WASHINGTON, A CORPORATION OF WASHINGTON.

ROTATIVE VALVE.

Application filed October 18, 1921. Serial No. 508,592.

My invention relates to valves, and particularly to swinging valves intended as reversing or throttle valves for steam engines. The principles on which my invention is based, however, may be applied to various types of oscillating or rotary valves which are subject to high pressures.

Primarily the object of my invention is to provide a valve and a method and means for operating the same such that the effort required to move the valve, in opposition to high pressures tending to hold it to its seat, is reduced to a minimum, so that valves held to their seats by many pounds or even tons of pressure can be readily moved by an operator, or otherwise, with the application of but little effort, and without the employment of intricate or unwieldy power-multiplying devices.

In accomplishing the primary object above it is an object of my invention to provide a valve so constructed that the friction between the contact surfaces of the valve and seat may be relieved or neutralized to such an extent that the operation of the valve will be rendered much easier than is the case with a like valve of ordinary construction.

Also in furtherance of the main object, a further object is to provide a means for operating an oscillating or rotative valve by which the fluid pressure acting thereon may be utilized wholly or in part to furnish the force which turns the valve.

The features of my invention which I believe to be new will be hereinafter described and then particularly defined in the claims.

The accompanying drawings show my invention embodied in a type of construction which is particularly applicable to the reversing valve of a steam engine, and show diagrammatically the operation of such a valve in accordance with the principles of my invention.

Figure 1:
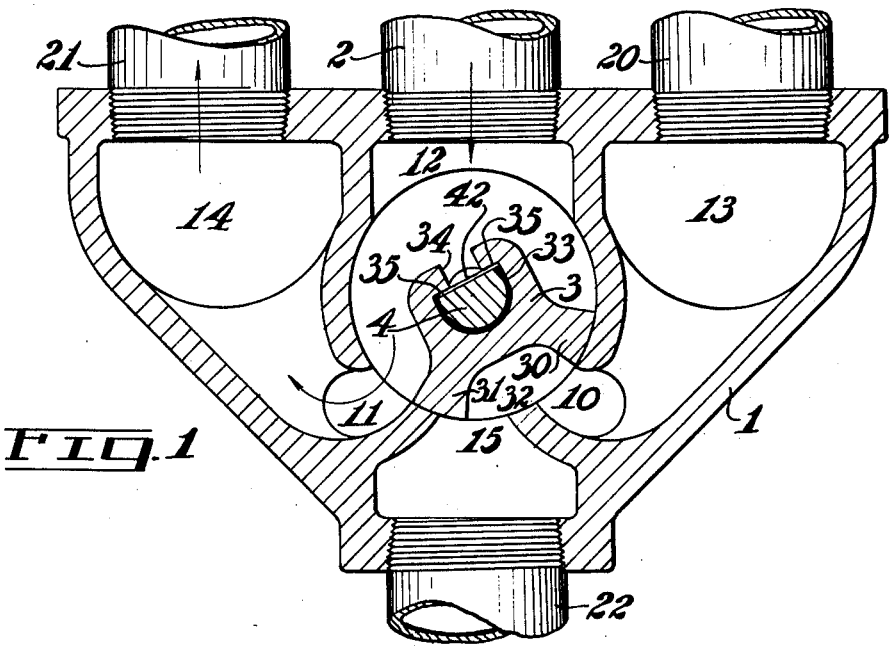
Figure 1 is a transverse section through the valve and the ports controlled thereby.
Figure 2:
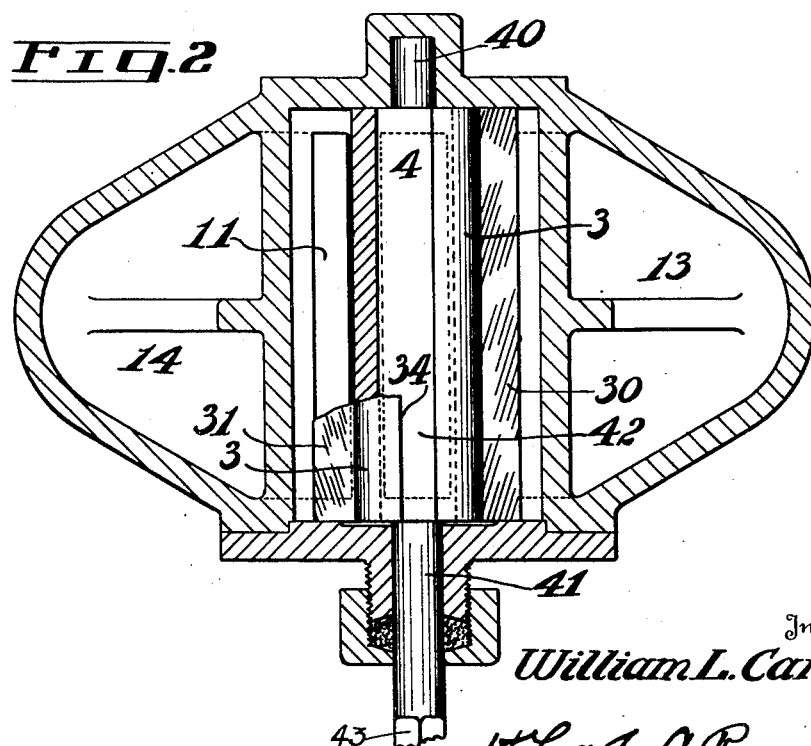
Figure 2 shows the valve casing in section along substantially an axial plane of the valve, with a portion thereof shown in plan view.

Figures 3, 4, and 5 are diagrams which illustrate the working out of the principles of my invention.

In the valve as herein illustrated a casing 1 is provided with four ports and pipes connected thereto, namely, the steam supply pipe 2, the steam distributing pipes 20 and 21 connected with opposite ends of the engine cylinder, and the exhaust pipe 22. Centrally the casing is provided with a cylindrical chamber 12 to which the supply pipe 2 is connected and in which is placed the valve 3. This chamber is provided with two ports 10 and 11 affording communication between the central valve chamber 12 and the end chambers 13 and 14 which connect with the respective pipes 20 and 21. The chamber 12 is also provided with a central exhaust port 15 which communicates with the exhaust pipe 22.

The type of valve to which my invention is best adapted is a valve having peripheral seating surfaces, and one in which the steam pressure tends normally to hold the valve down with considerable force upon its seat. A commonly used valve of this type is five and one-half inches in diameter, with an effective face area of forty-five square inches. Under steam pressure of 200 pounds per square inch such a valve is held to its seat with a force of 9000 pounds. Such valves are regularly required to handle the steam required by the high speeds and heavy loads employed in present day logging operations, and the provision of simple means for moving them has been a serious problem.

For the satisfactory application of the principles of my invention, the valve should also be one which may be slightly lifted from its seat. Such lifting from the seat need only be to such a minute extent as to permit the valve to be supported and to oscillate or tend to oscillate upon a fulcrum intermediate the ends of its legs, thus to prevent heavy friction when the valve is moved over its seating surface, and to permit the pressure itself to move the valve, in a manner which will be described hereafter. It has been found that the lifting need be only about enough to break the water seal without permitting any appreciable passage of steam, and in fact, it may be of such slight extent as to be invisible to the naked eye, or scarcely measurable, and yet this may be sufficient to accomplish the results desired.

Referring to Figure 1, it will be seen that the oscillable valve 3 is provided with an axially extending channel 33, preferably of part-circular cross-section, and which includes the center of oscillation $c$, (see Figures 3, 4, and 5). To operate satisfactorily in accordance with the principles of my invention, such an oscillable valve should have its seating surface contained entirely within an arc of 180°, as otherwise it could not be lifted from its seat. The same result might be secured with the valve extending over 180°, if the seating surface of the valve chamber extended through not more than 180°.

The channel 33 preferably extends through 180° or more of arc, and may have an open slot 34 intermediate the two legs or wings 30 and 31 of the valve. At the end of the part-circular portion of the channel 33 are formed inwardly projecting ledges or shoulders 35, which face inward with reference to the channel 33. Within this channel 33 is placed the valve stem 4, and as will be seen best in the exaggerated diagrams, Figures 3, 4, and 5, the stem 4, while it may conform to the general shape of the channel 33, does not fit closely therein, and is permitted some oscillatory movement relative to this channel and to the valve. The valve stem has ends 40 and 41 journaled in suitable bearings, an external squared portion 43 being provided by means of which the stem can be engaged for turning, and it has a flattened surface 42 which is complemental to the ledges 35. The edges of the surface 42 at appropriate times engage the ledges 35 at opposite sides of the valve, thus operating to turn the valve as the stem is turned, as will be explained hereafter.

It will be seen that such valves are in effect ordinary D valves, and as the valves chamber 32 between the legs 30 and 31 of the valve is always in communication with the exhaust port 15, and as the upper sides of the legs 30 and 31 are always exposed to the pressure within the chamber 12, the valve will be equally pressed to its seats at all points, whether it is an oscillable valve of the type illustrated or of some other type, as for example, a rotary valve.

At such times as it is desired to turn the valve from the position of rest shown in Figure 3, the stem 4 is moved in the direction it is desired to move the valve until an edge of its surface 42 engages beneath a ledge 35; this position is shown in Figure 4. The stem can be likened to a lever fulcrumed at $c$, the effort being applied at the end of the external rocker arm secured at 43, and which in one embodiment is 36 inches in length. The resistance to this effort is applied at $d$. The amount of this resistance is half the total steam pressure on the valve plus its weight, (a small item); it is not the whole pressure on the valve, because only the leg 30 tends to lift, the leg 31 tending to remain seated at the point $g$. Even considering the resistance Q applied at $d$ to be two-thirds of a total pressure of 9000 pounds, and considering the effective leverage $cx$ (perpendicular to the direction of application of the resistance) to be one-half inch, and the length L of the external rocker arm to be thirty-six inches, the effort P at the end of the rocker arm would be determined by the formula $$P = \frac{Q \times cx}{L}$$

or, substituting $$P = \frac{\tfrac{2}{3}\,9000 \times \tfrac{1}{2}}{36} = 83.3 \text{ pounds.}$$

Actual experience has shown it to be less under the conditions assumed, but other influences referred to hereafter enter as soon as the valve is lifted, or as soon as a fulcrum is provided at $d$.

Thus, associated with the idea of lifting the valve slightly from its seat, another principle is employed. This principle is illustrated in the diagrams, particularly in Figure 5. If the fulcrum of the valve be fixed at the center of oscillation, it is apparent that an effort applied to turn or oscillate the valve about this center will of necessity be great, owing to the steam pressure operating equally at $a$ and $b$ upon both sides of the valve to hold it against its seat. The only diminution of this effort in such cases will be the amount by which the lifting of the valve decreases its friction upon the seat. However, if the fulcrum of the valve be shifted to one side or the other of the center of oscillation $c$, it is evident that the pressure of steam upon the unequal areas thus produced at opposite sides of this fulcrum will be unequal, and the total pressure component on the temporarily longer side of the valve will tend to overcome the total opposed pressure component upon its shorter side, and will cause the valve to operate with little effort.

The valve, under such conditions, is no longer a freely floating valve, but a valve which is hung on a fulcrum at $d$, and which to a limited extent will tend to rock on this fulcrum. Referring to Figure 5, consider the forces acting over the whole of the valve with the fulcrum at $d$, and the points of application of the reaction at $f$ and $g$. The steam pressure is applied against the fulcrum $d$ along a line $dy$, at right angles to a line $gf$ joining the points of application of the reactions $f$ and $g$, respectively. The junction of these lines, at $y$, discloses a leverage effect, the short arm $yf$ serving to retard the valve, but the longer arm $yg$ serving to advance it. By reason of the high pressure and large area of the valve, but little difference in these lever arms is required to provide a sufficient resultant force to overcome the only obstacle to movement of the valve, which is its friction at $g$. This is doubly true because the lifting of the leg 30 has eliminated its friction at this point. Thus the steam pressure, acting along the lever arm $gy$, overcomes the steam pressure acting along the lever arm $fy$, and the steam pressure itself moves the valve.

This is only true so long as the point $d$ remains the fulcrum of the valve, but the only effort required at the stem is just enough to keep the leg 30 lifted, as previously described. This effort to lift the leg 30 is continued so long as it is desired to move the valve in a direction to advance this leg; when this leg has advanced sufficiently the slight force acting through the stem is removed, and the valve becomes again a free floating valve, pressed to its seat equally at all points. To reverse it, the fulcrum is shifted to $e$, and the same cycle occurs, reversed.

It is desired to point out that the force applied to the stem is only that required, acting through the lever arm $cx$ (see Figure 4) to overcome the steam pressure component tending to hold the leg 30 to its seat. The steam pressure component, acting along the lever arm $gy$, and opposed only by friction and the opposed pressure component acting along the lever arm $fy$, is the agency which actually moves the valve, and not the effort applied at the end of the external rocker arm.

Actual experience has shown an effort of about twenty-five pounds applied at the end of a thirty-six inch rocker arm only is required to move a valve of five and one-half inches diameter, with an effective face area of forty-five square inches, against a steam pressure of 200 pounds per square inch, and with a stem wherein the width of the face 42 is one inch. Thus twenty-five pounds of force moves the valve in opposition to four and one-half tons of pressure on a very small surface. This effort cannot be exactly calculated according to the formula given above, inasmuch as this disregards the assistance furnished by the unbalanced pressure component tending to swing the valve, but where P is the effort required to lift the valve; Q, the total resistance to lifting is assumed at one-half the total pressure upon the valve; $cx$, the effective short lever arm, is one-half inch; and L, the long lever arm (the rocker arm) is thirty-six inches, the formula $$P = \frac{Q \times cx}{L}$$

gives $$P = \frac{\frac{1}{2}(9000) \times \frac{1}{2}}{36} = 62.5 \text{ pounds.}$$

Thus the total effort is seen to be not to exceed 62.5 pounds, in the actual valve considered.

According to this invention, then, the movement of such an oscillable valve is accomplished by turning a central fixedly journaled stem, slightly loose in its connection with the valve, whereby it effects a line or edge contact with the valve, but slightly outside of and to one side of the center of oscillation, first to lift this side, and consequently to unbalance the valve at opposite sides of the fulcrum thus formed, and to commence its movement in one direction. Upon completion of movement in this direction, the stem may be oscillated to effect a line or edge contact with the valve at the opposite side of the oscillation, lifting this opposite side and again unbalancing the valve so that it tends to move in the reverse direction.

It will be noted that the fulcrums $d$ and $e$ are positioned at opposite sides of an axial plane through the valve and stem which is positioned medially of the ends of the legs 30 and 31. They are also between the center of oscillation and that leg which it is desired to advance. The valve stem acts primarily as a double ended lever to lift the valve from its seat, or at least to relieve the friction between the valve and its seat, and secondarily as a shifting fulcrum for the valve. It never acts solely as a positive turning agency for shifting the valve. By reason of the loose connection between the stem and valve, and by reason of the fact that the two fulcrums are located at opposite sides of the center or medial axial plane of the valve, a very large valve subjected to a considerable pressure may be moved with an effort extremely small in proportion to the total pressure on the valve.

While the valve operation shown and described is an oscillation, it is evident that the same principles may be employed with the same beneficial result with a valve which continuously rotates. The arc of movement of the valve is immaterial. The use of the principles herein disclosed makes it possible to move an unbalanced valve with an ease approximating that obtainable with a balanced valve.

What I claim as my invention is:

1. The combination with an oscillating valve having a circular segmental seating face and a complemental valve seat, the valve and valve seat being proportioned to permit a friction-relieving lift of the valve from its seat, a valve stem mounted concentric with the valve seat, the valve and stem having engaging fulcrum members located at opposite sides of the axial plane which bisects the valve face and the valve and stem engagement being sufficiently loose to thereby first lift the advancing edge of the valve from its seat before turning it while permitting maintenance of contact of the following edge of the valve with its seat throughout the movement of the valve.

2. The combination with an oscillating valve and its complemental seat proportioned to permit a friction-relieving lift of the valve from its seat, of a valve stem journaled concentric with the curved face of the valve seat, said valve and stem having a slack engagement adapted to lift the advancing edge of the valve from its seat to relieve the friction therebetween without affecting the contact of the following edge of the valve with the seat.

3. The combination with an oscillating valve having a seating face which is a segment of a circle and an operating stem loosely engaging therewith, said stem and valve having engaging surfaces extending transversely of the arc of their swing, whereby turning of the stem will first produce a lifting of the advancing edge of the valve while not affecting the bearing of the following edge of the valve upon the face, to thereby reduce the frictional contact between the valve and its seat.

4. The method of operating a circularly segmental oscillating valve which consists in applying a lifting force to the valve in a direction substantially perpendicular to a chord of its seating face and at a point removed from the axis of the valve towards the advancing edge of the valve, and in continuing the lifting action through an arc of a circle as the valve swings to thereby maintain a pressure-relieving lift upon the advancing edge of the valve throughout its turning movement while maintaining pressure contact between the following edge of the valve and its seat.

5. The method of operating a circularly segmental valve which consists in applying a lifting force to the valve in a direction substantially perpendicular to a chord of its seating face and at a point located between its center of movement and the advancing edge of such seating face, and in maintaining this condition as the valve turns, whereby the unbalanced pressure component acting upon the following side of the valve will act to turn the valve.

6. The combination with an oscillating valve having a seating face which is a minor segment of a circle, of a concentrically positioned operating stem therefor, said stem and valve having a fit loose enough to permit a slight angular play between them, the valve and stem having complemental rotatively engaged lifting surfaces at opposite sides of the axial plane of the valve which bisects its face, whereby turning of the stem will provide a fulcrum offset from the axis of the valve, and will produce a preliminary lifting of the advancing edge of the valve sufficient to relieve the friction between this section of the valve and its seat.

7. A rotative valve having peripheral seating surfaces, and a co-axially positioned operating stem, the valve having an axial stem-receiving channel provided with an inwardly projecting ledge at each side of its axial plane which bisects the valve face and the stem having faces engaging with said ledges whereby when the stem is turned, the advancing edge of the valve is lifted from its seat.

8. A rotative valve having peripheral seating surfaces, and a co-axially positioned operating stem, the valve having an axial stem-receiving channel provided with an inwardly projecting ledge at each side of its axial plane which bisects the valve face and the stem having faces engaging with said ledges whereby when the stem is turned, the advancing edge of the valve is lifted from its seat, the other surfaces of the stem and its receiving channel being relieved so as to permit a slight relative angular movement between valve and stem.

9. The combination with an oscillating valve, means forming a seat for and a concentric stem connected with the valve to permit a slight relative oscillation, said valve being normally held upon its seat by the fluid pressure, of means acting through the stem to apply a force at a point eccentric of the axis of stem and valve tending to lift the valve whereby the pressure of the fluid upon the areas of the valve towards the advancing edge thereof may be largely supported by the stem prior to movement of the valve over its seat.

10. The combination with an oscillating valve and a concentric stem connected with said valve to permit a slight relative oscillation, said valve being normally held upon its seat by the fluid pressure, of means acting through the stem for applying a force to the valve and at a point eccentric of the axis of the stem and valve, whereby the areas of the valve behind the offset fulcrum thus provided are greater than the areas in advance thereof, and whereby the pressure component of the fluid upon the greater areas tends to move the valve in a direction to advance the lesser areas.

11. The combination with a segmental valve movable about a center of movement, and a seat therefor concentric with such center of movement, a stem likewise movable about the same center of movement, said stem and the valve being loosely coupled, and the valve and stem being engageable, upon movement of the stem, along the fulcrum support located at one side of the center of movement.

12. The combination with a segmental valve movable about a center of movement, and a seat therefor concentric with such center of movement, a stem likewise movable about the same center of movement, said stem and the valve being selectively engageable, upon movement of the stem in opposite directions, along either of two fulcrum supports located at opposite sides of the center of movement.

13. The combination of a valve and a stem loosely coupled therewith, said stem being movable about a fixed center of movement, and being disposed and arranged, relative to the valve, to engage the valve for movement about the same center of movement along a fulcrum located outward of such center of movement.

14. The combination with a valve movable about a center of movement and having equal areas at opposite sides of such center of movement exposed to pressure, of means for moving said valve comprising a fulcrum member movable about the same center of movement, and engageable with the valve along a fulcrum located outward of such center of movement.

15. The combination with a valve oscillable about a center of oscillation and having equal areas at opposite sides of such center of oscillation exposed to a given pressure, of a fulcrum member oscillable about the same center of oscillation and movable relative to the valve to shift the fulcrum support of said valve from one side to the other of such center of oscillation.

16. The combination with a segmental valve movable about a center of movement, of a stem concentric with the valve and having a valve-engaging fulcrum edge outward of the center of movement, the stem and valve being disposed and arranged to permit movement of the stem relative to the valve in any position of rest, to shift its fulcrum outward of the center of movement.

17. The combination with a segmental oscillating valve, of a stem concentric with the valve and having two valve-engaging fulcrum edges outward of and at opposite sides of the center of oscillation, the stem and valve being disposed and arranged to permit slight movement of the stem relative to the valve, whereby either of said fulcrum edges is selectively engageable with the valve.

18. The combination with a segmental valve movable about a center of movement and a seat therefor concentric with said center of movement, the legs of the valve at opposite sides of the center of movement having equal areas exposed to a given pressure, of a lever movable about said center of movement relative to said valve and engageable with said valve between the center of movement and the end of one leg, whereby this leg of the valve is lifted from its seat and the valve is fulcrumed outwardly of its center of movement.

19. The combination with a segmental valve oscillable within a closed pressure chamber about an axis of oscillation and a seat therefor concentric with said axis of oscillation, the legs of the valve, at opposite sides of a plane through the axis of oscillation and medially disposed relative to the opposite legs of the valve, having equal areas exposed to the pressure within said chamber, of a member having means for engaging the valve at opposite sides of said median plane, and inward of the end of either leg, and forming in effect a double-ended lever oscillable relative to the valve and its seat about the same axis of oscillation, whereby as either leg is engaged thereby it is lifted from its seat and the valve is temporarily fulcrumed outward of the axis of oscillation and at the selected side of the aforesaid median plane.

Signed at Seattle, King County, Washington this 11 day of October, 1921.

WILLIAM L. CARSON.